Nov. 6, 1923.

M. IAFRATE 1,473,556

AUTOMOBILE IDENTIFICATION DEVICE

Filed Nov. 24, 1922

WITNESSES

INVENTOR
Michele Iafrate
BY
ATTORNEYS

Patented Nov. 6, 1923.

1,473,556

UNITED STATES PATENT OFFICE.

MICHELE IAFRATE, OF NEW YORK, N. Y.

AUTOMOBILE IDENTIFICATION DEVICE.

Application filed November 24, 1922. Serial No. 603,048.

*To all whom it may concern:*

Be it known that I, MICHELE IAFRATE, a citizen of the United States, and a resident of the city of New York, borough of Manhattan, in the county and State of New York, have invented a new and Improved Automobile Identification Device, of which the following is a full, clear, and exact description.

This invention relates to a device for identifying the operators and owners of automobiles, and has for an object the provision of a simple, economically manufactured device that can be readily applied to any car whereby the proper owner or operator of the car can be readily identified, for the purpose of eliminating theft and the unauthorized operation of automobiles.

Another object resides in the particular construction and arrangement of parts which are hereinafter described and claimed and shown in the accompanying drawings.

The invention is illustrated in the drawings, of which—

Figure 1:
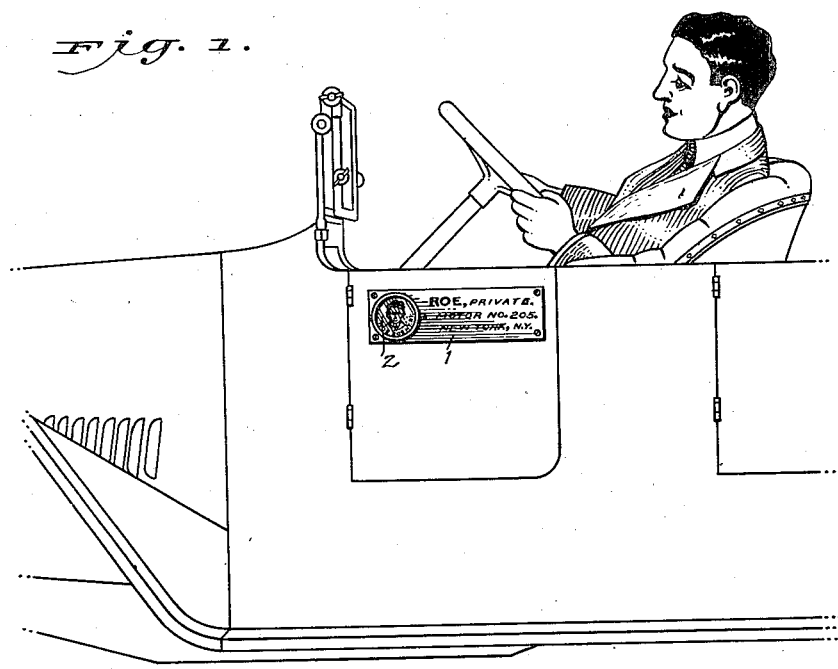
Figure 1 is a partial side view of a car with my device applied thereto.

The form of the invention shown in the drawings is a preferred form, although it is understood that modifications in the construction and arrangement of the parts and in the character of the materials used may be adopted without departing from the spirit of the invention.

The invention as illustrated in the drawings, which is a preferred form, includes the application to an automobile, preferably in some conspicuous part observable to persons interested in the elimination of theft of automobiles and unauthorized use thereof, of a plate 1 of any suitable form or size on which is suitably mounted a photograph 2 of the authorized operator or the owner of the car, together with his name and other necessary information as to his right to operate or drive the car, including the operator's license number and the State within which the driver or owner is authorized to operate the car.

Figure 2:
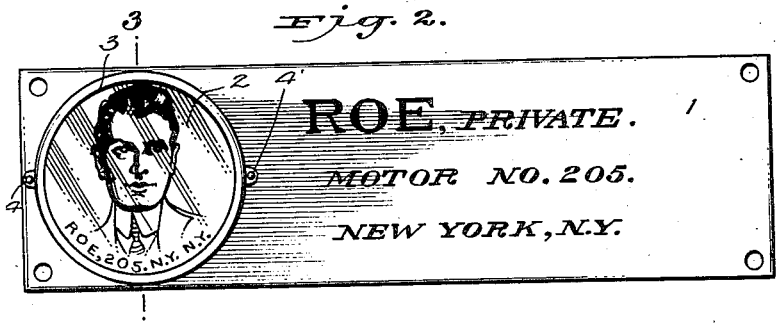
Fig. 2 is an elevation of an identification plate of one form.
Figure 3:
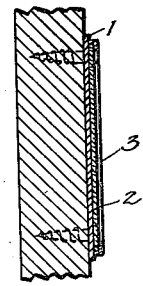
Fig. 3 is a section taken on the line 3—3 of Fig. 2.

As shown in Fig. 2, the photograph 2 may be made or formed separately from the plate 1 and held thereagainst by being confined within a frame 3 attached to the plate 1 by any suitable means, such as rivets 4.

Figure 4:
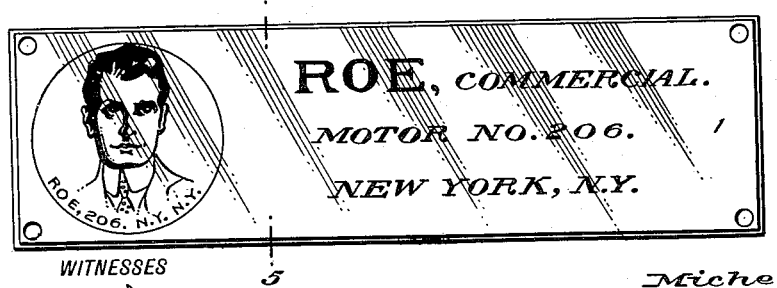
Fig. 4 is a similar plate of slightly different formation.
Figure 5:
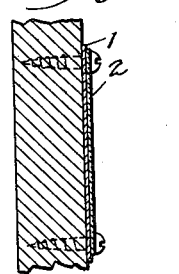
Fig. 5 is a section taken on the line 5—5 of Fig. 4.

On the other hand, as in the form shown in Fig. 4, the photograph may be impressed or otherwise formed directly on the surface of the metal of the plate 1. This impression may be made by any suitable or well known process, the plate in this case containing similar information to that shown on the other plate.

With such a device attached to a car, it will be impossible for any one driving a car without authorization or in an illegal manner to escape detection, because an instantaneous comparison can be made between the photograph on the plate and the person driving the car, and if they are not the same the person so driving will have to give an account of himself satisfactorily to the authorities.

The particular disposition of the plate on the car is of no especial importance except that it should be placed in a position where it can be readily observed and compared with the driver.

What I claim is:—

An automobile identification device, which includes a plate disposed flat against the surface of a car, a portion of said plate containing information as to the identity of the driver, a photograph frame detachably secured on the face of another portion of said plate, and a photograph of the driver within said frame.

MICHELE IAFRATE.